United States Patent [19]
Othmer et al.

[11] Patent Number: 5,701,138
[45] Date of Patent: Dec. 23, 1997

[54] RESOLUTION INDEPENDENT METHODS FOR RENDERING A GRAPHIC IMAGE ON A DISPLAY DEVICE

[75] Inventors: Konstantin Othmer, San Jose; Shannon Holland, Palo Alto, both of Calif.

[73] Assignee: Apple Computer, Inc., Cupertino, Calif.

[21] Appl. No.: 626,903

[22] Filed: Apr. 4, 1996

Related U.S. Application Data

[63] Continuation of Ser. No. 59,903, May 10, 1993, abandoned.

[51] Int. Cl.$^6$ .................................................. G09G 5/00
[52] U.S. Cl. ........................ 345/132; 345/136; 382/298
[58] Field of Search .............................. 345/132, 136, 345/137, 138, 127, 128, 129, 130, 131; 382/293, 294, 295, 298, 299; 395/128, 138, 139

[56] References Cited

U.S. PATENT DOCUMENTS

| | | | |
|---|---|---|---|
| 4,484,347 | 11/1984 | Kashioka . | |
| 4,975,976 | 12/1990 | Kimata et al. | 382/44 |
| 5,107,255 | 4/1992 | Shiraishi | 382/47 |
| 5,265,176 | 11/1993 | Miller | 382/44 |
| 5,293,432 | 3/1994 | Gonser et al. | 382/44 |

FOREIGN PATENT DOCUMENTS

| | | |
|---|---|---|
| 0525996 | 2/1993 | European Pat. Off. . |

OTHER PUBLICATIONS

Alabert, F. and Mallet, J.L., A Local Grid Updating Scheme For Interpolation, *An International Journal*, 1989, pp. 1019–1023.

Leberl, Franz, Photogrammetric Interpolation, *Photogrammetric Engineering and Remote Sensing*, Jan. 1975, pp. 603–612.

*Primary Examiner*—Xiao Wu
*Attorney, Agent, or Firm*—Fenwick & West LLP

[57] ABSTRACT

Resolution independent methods for rendering a graphic image on a display device include: a method for re-gridding an image for fast off screen to on screen transfers; and a method for modifying an image to encompass all pixels of the device resolution for both local and global gridding. The method for modifying an image to encompass all pixels of the device resolution for both local and global gridding comprises the steps of: determining the period at which the pixel pattern in the device space repeats; determining the relationship between the origin of the global space and the origin of the local space; mapping the image from source space to device space; determining whether the local origin is at a point with the same period as the origin of the global space; creating a difference table between the local and global space mappings; comparing the upper left point defining the source region to the difference table; increasing the source region on the left and top by the offset in the difference table; comparing the lower right point defining the source region to the difference table; and increasing the source region on the bottom and right by the offset in the difference table.

9 Claims, 4 Drawing Sheets

RESOLUTION INDEPENDENT METHODS FOR RENDERING A GRAPHIC IMAGE ON A DISPLAY DEVICE

RELATED APPLICATIONS

This is a continuation of application Ser. No. 08/059,903 filed on May 10, 1993, now abandoned.

BACKGROUND OF THE INVENTION

1. Field of the Invention

The present invention relates generally to methods for displaying graphic images on a display device. In particular, the present invention relates to a computer implemented method for rendering a graphic image to a display device independent of the resolution of the display device.

2. Description of the Related Art

Present day graphic systems typically provide a "source space" that refers to the source resolution that defines an image. An image is defined in terms of global and/or local coordinates of the source space. The coordinate system that defines an image may either be local or global. "Global space" refers to a global coordinate space (encompassing many other coordinate spaces) that is at source resolution. "Local space" is a coordinate space that is contained within global space that is also at source resolution. It's coordinate space is local to a referenced point in global space. The computer under user direction manipulates and edits an image by changing various parameters of the image in global and/or local coordinates. After the computer has performed all the desired manipulations on the graphic image, the image is rendered upon a display device by converting the image definition from source space into "device space." "Device space" refers to the characteristics of the device upon which the image is being rendered. There may be a one to one correspondence between device space and source space (i.e., the same resolution is used in source space as in device space), in other cases, the source space must be mapped to device space using a mapping function that accounts for the differences in the resolutions between the source space and device space.

One problem in rendering a graphic image to a display device is gridding. Gridding occurs when mapping an image defined in one resolution to a second different resolution. Images are conventionally defined by specifying the extents and bounds of the image in source space units of the local or global coordinate system. When the image is rendered on the display device, the image is transformed from source units of the local or global coordinate system to device units or pixels of the display device. The diagram shown in FIG. 1 illustrates the transformation from a source space of 72 dots per inch (dpi) to a device space of 128 dpi. The rounding or truncation function determines how the gridding will take place. As shown in FIG. 1, a source unit is mapped either to one device pixel or two device pixels. For example, source pixel 3 maps to a single device pixel e while the adjacent pixel 4 maps to two device pixels f and g. The source unit could be mapped to even more pixels depending on the difference between the resolution of the source space and the device space. The detrimental effects of gridding become apparent when considering rendering a line six source units in length. As shown, if the line is drawn from pixel 1 to 6 of source space, the line has a length of 11 pixels from pixels a through k when rendered in device space. If a line of the same length is drawn at pixel 4 to 10 of source space, the length of the line in device space is 12 pixels from f–q. Therefore, the same length line in source space can have different lengths in device space depending on where the line is positioned. This gridding creates problems since the size of windows and other images on the display device change size depending on their position on the display device.

Another problem with graphics systems of the prior art is that the ownership of device pixels is dependent on whether the source space uses local or global coordinates. As illustrated in FIGS. 2A and 2B, the device pixel(s) that corresponds to a particular source pixel varies depending on whether global or local gridding is used. Both FIGS. 2A and 2B show the mapping of ten pixels of source space to seventeen device pixels for a change in resolution from 72 dpi in source space to 128 dpi in device space. In the global space of FIG. 2A, pixel 2 is represented by two device pixels c and d. However, as shown in local space of FIG. 2B, the same pixel 2 is represented by a single device pixel c. The differences in ownership of device pixels is problematic because it prevents the fast transfer of images from off screen to on screen. Because of the differences, many images defined in global coordinates must be translated and processed before display on the screen. Thus, the images cannot be quickly transferred to screen of the display device. Therefore, there is a need for a method of preprocessing images so that they can be presented on the display device very quickly. An added problem is that in many instances the local and global device grid is unknown. Therefore, it is only possible to process the image after device grid is known which occurs just before rendering.

Therefore, there is need for methods of resolving the above gridding problems introduced by multiple origins and varying resolutions.

SUMMARY OF THE INVENTION

The present invention overcomes the limitations and shortcomings of the prior art with a plurality of methods for improving the quality of graphic images produced on the display device independent of the resolution of the display device. The present invention advantageously includes: a method for re-gridding an image for fast off screen to on screen transfers, and a method for modifying an image to encompass all pixels of the device resolution for both local and global gridding. These methods can be used alone or in combination to greatly enhance the graphic images displayed on a display device.

The preferred embodiment of the method for modifying an image to encompass all pixels of the device resolution for both local and global gridding is particularly advantageous because it eliminates the gridding problems for changes in resolution. Some of the major steps in the preferred method for modifying an image to encompass all pixels of the device resolution for both local and global gridding include: determining the period at which the pixel pattern in the device space repeats; determining the relationship between the origin of the global space and the origin of the local space; mapping the image from source space to device space; determining whether the local origin is at a point with the same period as the origin of the global space; creating a difference table between the local and global space mappings; comparing the upper left point defining the source region to the difference table; increasing the source region on the left and top by the offset in the difference table; comparing the lower right point defining the source region to the difference table; and increasing the source region on the bottom and right by the offset in the difference table.

DETAILED DESCRIPTION OF THE PREFERRED EMBODIMENTS

The present invention provides a number of novel methods that greatly enhance the ability of a computer to render graphic images on the screen of a display device independent of the resolution at which the display device operates. As described above, the phase of the device grid is determined by the origin of the local coordinate system. When double buffering an area of an image to be displayed on the screen, the area may be defined in global coordinates (which has one grid) rather than the device local coordinates it will be latter drawn in (another different grid). The present invention advantageously translates the off screen image to match the gridding of the local coordinate space in which it will be used. To increase the speed at which images can be rendered on the screen of a display device, it is advantageous if the off screen representations of the screen's contents are aligned and gridded (assigning source pixels to particular device pixels) identically to the screen's grid. However, when the off screen representations are created, their corresponding local context, and thus, their gridding may not be available. The gridding only becomes known when the off screen to on screen transfer occurs. The method of the present invention is used to re-grid the off screen representation to match the on screen gridding, and thereby improving the speed at which images can be displayed.

Figure 1:
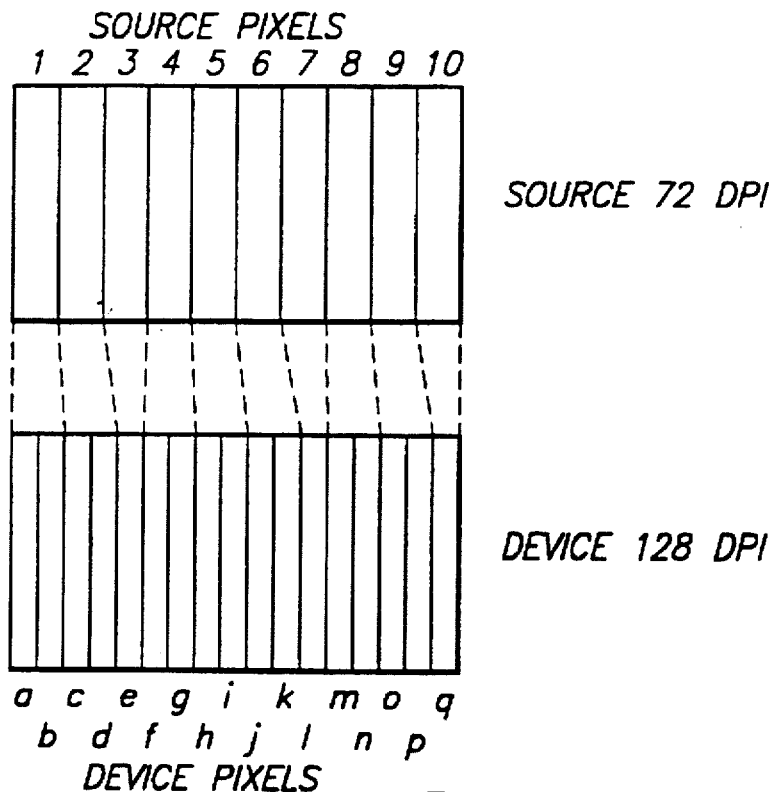
FIG. 1 is a graphic representation of the prior art mapping of an image from source space to device space.
Figure 2A:
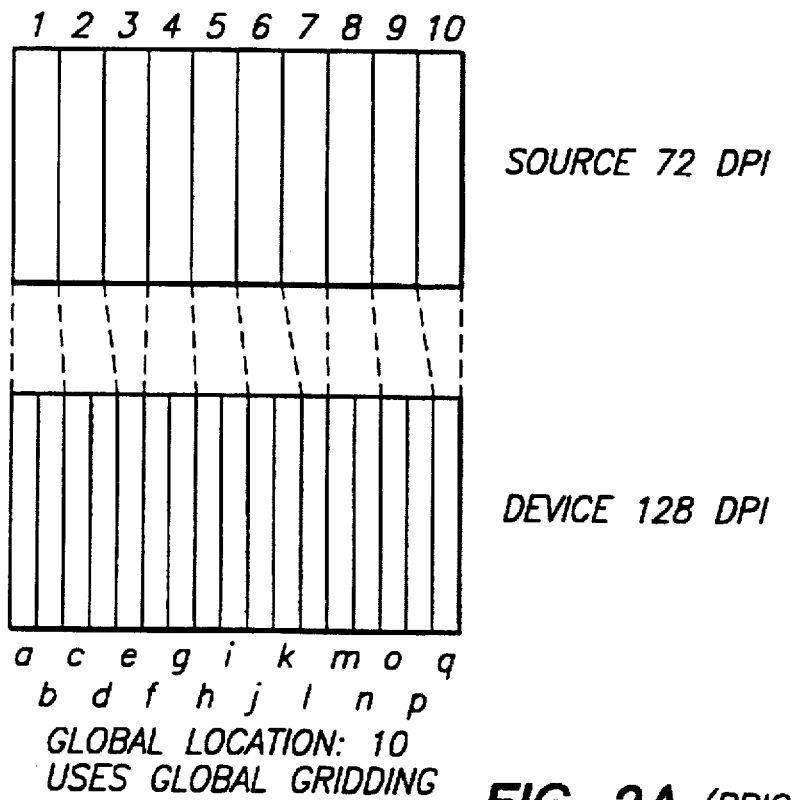
FIG. 2A is a graphic representation of the prior art mapping of an image from global source space to device space.
Figure 2B:
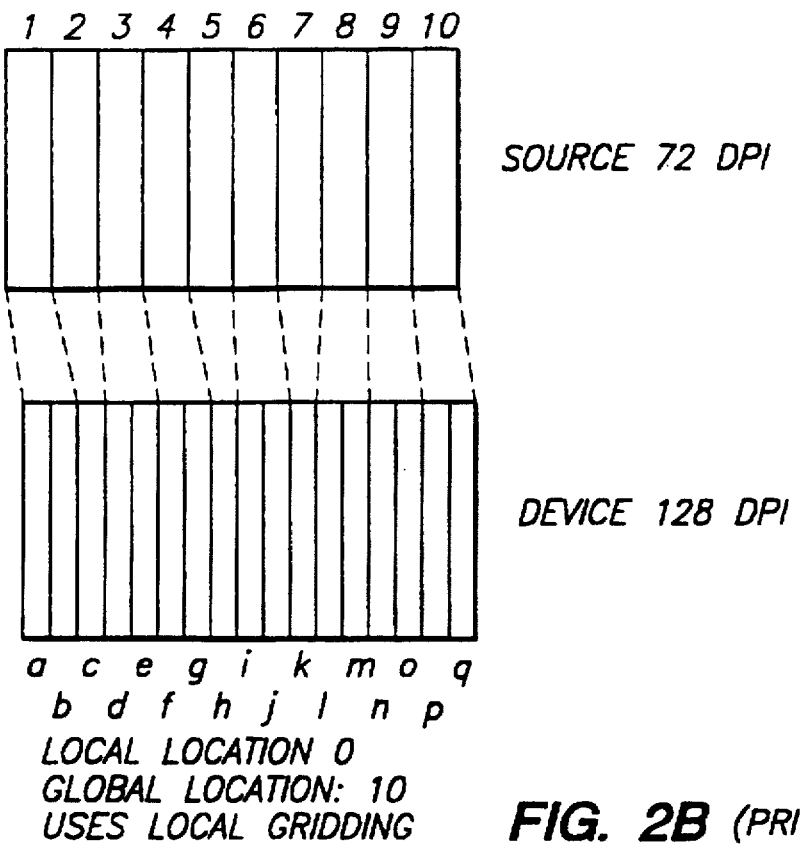
FIG. 2B is a graphic representation of the prior art mapping of an image from local source space to device space.
Figure 3:
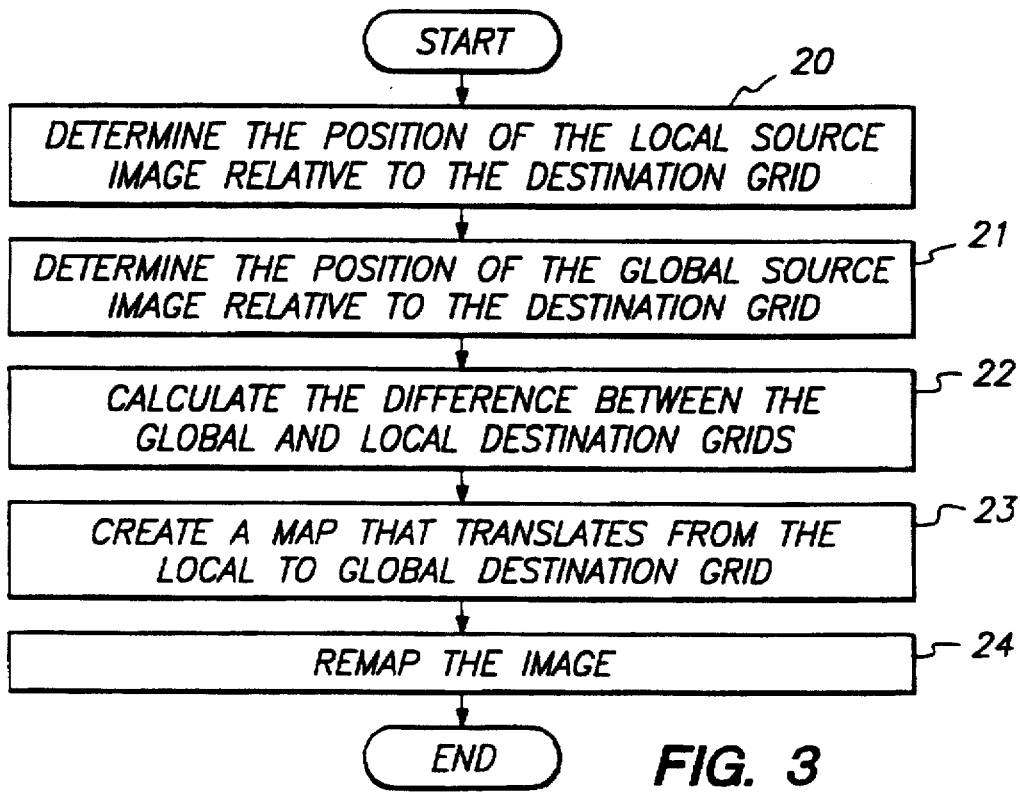
FIG. 3 is a flow chart of the preferred method of the present invention for re-gridding an image from local source space to global source space.

Referring now to FIG. 3, a preferred embodiment of the method of the present invention for re-gridding an image for fast off screen to on screen transfer will be described. The present invention provides a method by which an image may be modified to match the global gridding for output on the display device. For example, an image may be mapped to device space from local coordinates such that the image has a particular device grid, as shown in Table 1. However, the pixel ownership of the image with respect to the global coordinates may differ as illustrated in Table 1. The present invention advantageously

TABLE 1

| 1 | 1 | 1 | 1 | 1 | 1 | 1 | 1 | 1 | Local source pixel |
| 2 | 2 | 1 | 2 | 2 | 2 | 1 | 2 | 2 | Device Pixels (local mapping) |
| 2 | 1 | 2 | 2 | 2 | 1 | 2 | 2 | 2 | Device Pixels (global mapping) |
| 0 | −1 | 1 | 0 | 0 | −1 | 1 | 0 | 0 | Difference | re-grids the image to match the global grid on the screen for quickly transferring the image to the screen. The preferred method begins with step 20 and determines the position of the local source image relative to the destination grid (local mapping). Then in step 21 the method determines the position of the global source image with respect to the destination grid (global mapping). In step 22, the method calculates the difference between the local and global destination grids. Next in step 22, the method uses the differences between the local and global destination grids to create a mapping function that translates from the local source space to the global destination grid. From the difference table, the mapping between local device pixels and global device pixels can be determined. For example, the mapping function indicates that row 1 of source maps to two rows of destination, row 2 of source maps from two rows to one row of destination, etc. The mapping for the columns is done in a similar fashion. Finally in step 23, the method maps the local source image to the global destination grid using the mapping function of step 22. This step is preferably performed by expanding or collapsing the rows and columns of the image according to the difference table. If the value from the difference table is 1, the pixel is expanded by one; if the value is 0, there is no change; and if the value is −1, multiple pixels are combined into a single pixel.

When a region whose definition is ambiguous in device terms, (e.g., it is unclear whether the region was created purely in local space, global space or some combination thereof), the present invention defines a union device space region which contains the union of both possibilities. Through this defining process, a suitable device space region is produced by managing a universal source region. Without this defining process, separate source regions for the different coordinate spaces would have to be managed, and then later combined to form the device space region.

Figure 4A:
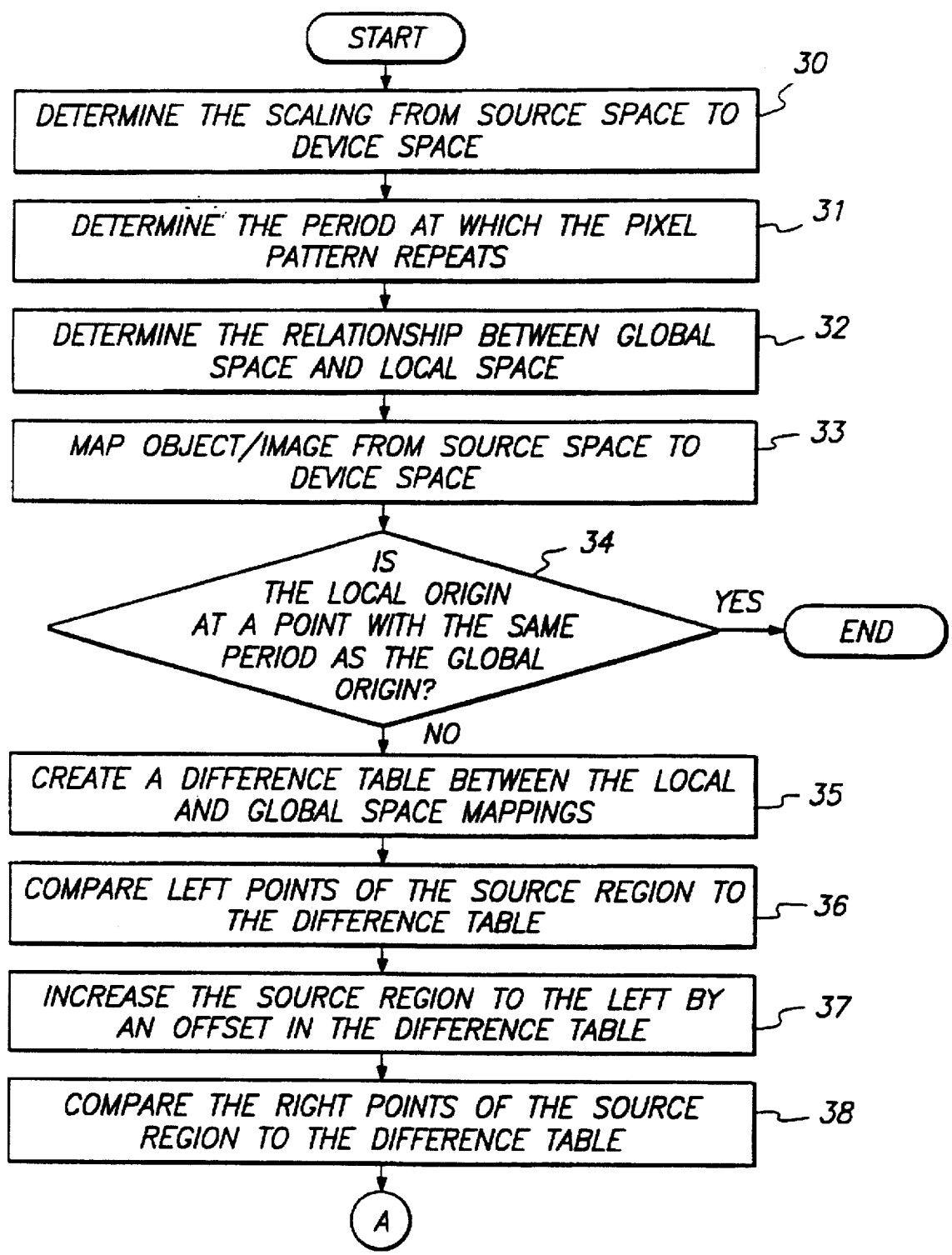
FIGS. 4A and 4B are a flow chart of the preferred method of the present invention for modifying an image to encompass all pixels of the device resolution for both local and global gridding.
Figure 4B:
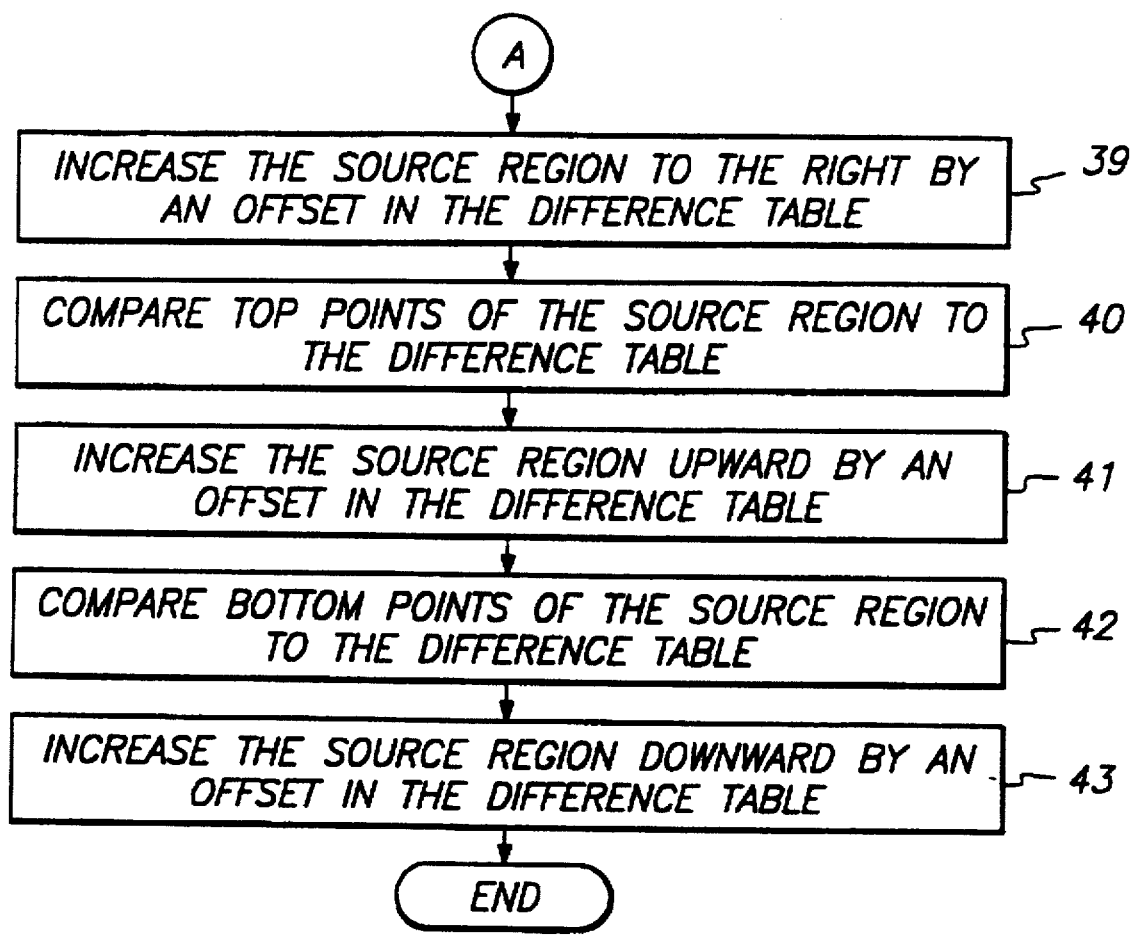

FIGS. 4A and 4B show the preferred method for creating a destination region that encompasses all pixels of the device resolution for both local and global gridding. The present invention provides a process by which a single region that can be used as either a global region or a local region can be modified so that it produces a final destination region at device resolution that encompasses all pixels. This is particularly useful where a single region is kept in one space (such as global space), but may contain data that is actually from local space. The final destination region comprises the union of both mappings. This method for modifying the image is accomplished by defining a superset of all possible device pixels when the origin (and thus the gridding) of the source area is unknown. For example, on the Macintosh Computer produced by Apple Computer of Cupertino, Calif., the update region is a collection of regions defined in various coordinate spaces. When using this region, it is necessary to include all possible device pixels when the region is mapped for source space to device space.

Those skilled in the art will realize that the preferred method may be performed either in source space or device space. The method may be performed on the region in source space with the results being left in source space or the method may be performed on the region in device space as it is mapped to a particular device. In either space, the process is similar, and the description of the preferred embodiment of the method in device space is provided only by way of example.

Referring now to FIGS. 4A and 4B, the preferred method for creating a destination region encompassing the global and local device pixels begins in step 30 by determining the differences in resolution between the source space and the device space. Next in step 31, the method determines the period at which the pixel pattern in the device space repeats. For any resolution change, the pixel expansion or reduction will follow a pattern that has a defined period. This period can be determined by the following formula:

Period=Source Resolution/GCD(Source Resolution, Device Resolution)

where GCD denotes the function of greatest common divisor. Then in step 32, the preferred method determines the relationship between the origin of the global space and the origin of the local space. Then in step 33, the method maps the image from source space to device space. In step 34, the method determines whether the local origin is at a point with the same period as the origin of the global space. If so no adjustment to the mapping is necessary and the method ends.

However, if the origin of the local space is not at a point with the same period as the origin of the global space, the method begins the process of creating a source union region containing both mappings in step 35. The method creates a difference table between the local and global space mappings in step 35. In an alternate embodiment, the this table may be pre-computed and need only be retrieved in step 35. From the difference table, problematic pixels where the source region, the region being mapped from source space to device space, needs to be enlarged to eliminate gridding problems can be identified. If a region borders on such a problematic pixel, the method enlarges the size of the region so that a new region including both global and local mappings will be defined. The region is only enlarged and never reduced. The top, bottom, right side or left side of the source region can be moved outward to create the union space encompassing the global and local spaces. The consistent enlargement of the region in problematic pixel areas eliminates the gridding problems described above. The expansion process begins in step 36 by comparing one or more points at the left of the source region to the difference table. Then in step 37, the source region is increased to the left by the offset in the difference table. The offset in the difference table is preferably negative if the region needs to be expanded. The offset is preferably added to the horizontal coordinates of the left point defining the source region, thereby moving the left edge further to the left by the required pixel distance. Next in step 38, the method compares one or more points on the right of the source region to the difference table. If the value in the difference table for the location of the right point is positive, the right edge is moved to the right to expand the source region in step 39. Again, moving the right point is preferably accomplished by adding the value in the difference table to horizontal coordinate portions of the right points defining the source region. Since the value is now positive, the boundary of the region is moved to the right by addition. In step 40, the process continues by comparing one or more points on the top edge of the source region to the difference table. Then in step 41, the source region is increased upward by the offset in the difference table. In step 42, the method continues by comparing one or more points on the bottom edge of the source region to the difference table. Then in step 43, the source region is increased downward by the offset in the difference table. The increases upward and downward can be performed in a similar manner to adjustments in horizontal direction by addition of the value from the difference table. Those skilled in the are will realize that the steps of comparing to the difference table and adding the offset can also be performed in multiple directions at one time by making comparisons and adjustments in more than one.

The method for creating a destination region encompassing the global and local device pixels can best be understood with reference to the following example. For the present example, the source space is 72 dpi, and device space is 128 dpi and uses mostly horizontal coordinates. However, those skilled in the art will realize that the method of the present invention will work for any resolution combinations and the process for vertical coordinates is the same as horizontal. The local grid has an origin of (1,1) in global coordinates, and the region of interest is defined by the points (1, 1) and (7, 7) in global coordinates.

The present invention begins by determining the scaling from the source space to the destination space (step 30). The space is being change from 72 dpi to 128 dpi so that there are about 1.78 device pixels for each source pixel. Because of rounding/truncation, this means that most source pixels will map to two device pixels, however, there will be a few pixels (about 2 out of 10) that will map to a single pixel. Next, the period of the pixel pattern is determined (step 31). Using the formula provided above, we get the equation:

$$\begin{aligned} \text{period} &= 72/GCD(72,128) \\ &= 72/8 \\ &= 9. \end{aligned}$$

Thus, every 9 source pixels, the device grid resulting from the 72 dpi to 128 dpi expansion will repeat itself. The grid for a 72 dpi to 128 dpi expansion would be as shown in Table 2 (the numbers represent the number of device pixels per each source pixel).

TABLE 2

| 1 | 1 | 1 | 1 | 1 | 1 | 1 | 1 | 1 Source Pixels (72 dpi) |
|---|---|---|---|---|---|---|---|---|
| 2 | 2 | 1 | 2 | 2 | 2 | 1 | 2 | 2 Device Pixels (128 dpi) |

Thus, the first two source pixels would each map to two device pixels, but the third and seventh source pixels would only map to one device pixel. Next, the preferred method determines the relationship between the origin of the global space and the origin of the local space (step 32). Because objects are mapped in their own local coordinate system, the global to device grid may be aligned differently than the local grid of a given port. This misalignment causes problems if the difference between the origins of the global and local coordinate systems is not a whole multiple of the resolution period. In our example, the global grid starts of at pixel zero. Thus it's grid is as shown in Table 3.

TABLE 3

| 2 | 2 | 1 | 2 | 2 | 2 | 1 | 2 | 2 Device Pixels (Global grid) |
|---|---|---|---|---|---|---|---|---|

The local space's origin is at (1,1) in global space. It's "local" grid is the same as in Table 2. However, because the local space's origin is offset by one from the global grid, the global grid lying "underneath" the local grid is shown in Table 4.

TABLE 4

| 0 | 1 | 2 | 3 | 4 | 5 | 6 | 7 | 8 Local Pixel Number |
|---|---|---|---|---|---|---|---|---|
| 2 | 2 | 1 | 2 | 2 | 2 | 1 | 2 | 2 Device Pixels (Local grid) |
| 2 | 1 | 2 | 2 | 2 | 1 | 2 | 2 | 2 Device Pixels (Underlying Global grid) |

Since the origin of the local space is one, it's grid begins at global grid location one, which is at device location two. Pixel 0 (two device pixels wide) in local space lies over a two pixel wide global pixel, but pixel 1 (also two device pixels wide) in local space lies over a global pixel that is only one pixel wide. Thus, local pixel 2 will start at a different device location than the equivalent global pixel 3 (it will start at device location 6 as opposed to the global pixel which will start at device pixel 5). The process of the present invention advantageously takes the larger of the two mappings. If this point were to be on the left edge of a region, it would map to device pixel 5. If the point were on the right edge of the region it would map to device pixel 6.

The region is then mapped from source space to device space (step 33). As noted above, the steps of enlarging the region can take place in either source space or device space. If it is performed in device space as in this example, the source space point is mapped to device space and then offset to the correct device location. If the enlarging is in source space, the source space point is moved by one source space pixel (this can create a larger device space region than necessary once it is finally mapped to device space).

Next, the method of the present invention determines whether the difference between origins of the two coordinate systems is an even multiple of the period (step 34). If the distance between the origins of the two coordinate systems is an even multiple of the period of the grid, the local and global mappings will always be equivalent, thus no expansion of the region is necessary and the process is complete. In the current example, the difference between the local and global origins, 1, is not an even multiple of the period, 9. Therefore, the preferred method continues by retrieving a pre-computed difference table, or computing a difference table between the local and global mappings (step 35). Table 5 shows the absolute pixel positioning for the global grid from the left edge of the 72 dpi mapping and starting at global pixel 1. Table 5 also shows the absolute device pixel locations for the local grid. The local grid starts at global offset 1, which is two pixels wide.

TABLE 5

| 2 | 4 | 5 | 7 | 9 | 11 | 12 | 14 | 16 | Global grid absolute |
| 2 | 4 | 6 | 7 | 9 | 11 | 13 | 14 | 16 | Local grid absolute |
| 0 | 0 | 1 | 0 | 0 | 0 | 1 | 0 | 0 | Offset |

The relative offsets from global space to local space are also shown in Table 5. Similarly, Table 6 shows the difference between global and local mapping for a local coordinate space with a global origin of one.

Thus, normal gridding of the exemplary source rectangular region that is defined by the points (1,1), (7,7) in global coordinates would be to a (2,2), (12,12) destination region. However the point (7,7) is on the bottom right edge and it's table entry (coordinate value mod table period) is one from Table 5. Thus, the device space point will be moved down and to the right one pixel (step 39). Thus, the destination region comprising the union of the two spaces is (2,2), (13,13).

If this same region were to be expanded in source space, much the same approach would be taken. However, the offsets for any pixel would always be a magnitude one. The table values would merely be used to determine if the offset is negative, zero or positive. For the region used in the above example, the expanded source space region would be: (1,1), (8,8). When eventually mapped to device pixels, this would be larger than it absolutely need be, but it is guaranteed to contain all required device pixels.

Those skilled in the art will realize that the method of the present invention can be extended to expand a single source space region for multiple device resolutions. This process is similar to the one mentioned above only slightly more involved. The period for multiple device grids can be computed in the same way using the equation:

Period=Source Resolution/GCD(Source Resolution, Device 1 Resolution, Device 2 Resolution ... Device n Resolution).

The actual mapping is slightly more complex as it involves combining several overlap tables. This is done by combining all tables into two new ones. A first table is for the top/left mappings and contains the composite of all tables with negative entries. The second table is for the bottom/right edges and is a composite of all tables with positive entries. These tables can then be used as has been described above in the comparison and enlargement steps to determine the amount to enlarge the destination region for each resolution.

While the present invention has been described with reference to certain preferred embodiments, those skilled in the art will recognize that various modifications may be provided. For example, there may be other embodiments for

TABLE 6

| | Local Space | | | | | | | | Global Space | | | | | | | | |
|---|---|---|---|---|---|---|---|---|---|---|---|---|---|---|---|---|---|
| Source Pixels | 0 | 1 | 2 | 3 | 4 | 5 | 6 | 7 | 8 | 0 | 1 | 2 | 3 | 4 | 5 | 6 | 7 | 8 | 9 |
| Device Grid | 2 | 2 | 1 | 2 | 2 | 2 | 1 | 2 | 2 | 2 | 2 | 1 | 2 | 2 | 2 | 1 | 2 | 2 | 2 |
| Device Pixels | 2 | 4 | 6 | 7 | 9 | 11 | 13 | 14 | 16 | 0 | 2 | 4 | 5 | 7 | 9 | 11 | 12 | 14 | 16 |
| Relative Offsets | 0 | 0 | −1 | 0 | 0 | 0 | −1 | 0 | 0 | 0 | 0 | 0 | 1 | 0 | 0 | 0 | 1 | 0 | 0 |

This means that the global device grid is offset from the local space's device grid by one source pixel.

The direction the source region is enlarge and by how much is determined by a comparison of the shape of the source region and the difference table computed above (steps 36 and 37). Points on the left edge of the region are only moved to the left, and those on the right edge are only moved to the right (steps 37 and 39). Similarly, top points are moved only up and bottom points only down. Thus, a left edge pixel will be moved if the offset in the table is negative (meaning the local point maps to the left of the global point). In the example above, no left edge pixels will be moved as none of the offsets in the table are negative. Likewise, no vertical points will be moved. Bottom and right edge points will be moved in cases where their table entry is positive.

the preferred method for enlarging the destination region to include both the local and global spaces in addition to that described with reference to FIGS. 4A and 4B. Similarly, there may be other embodiments for the method of re-gridding an image from local source space to global source space. In yet another embodiment, the destination region may be minimized to an intersection of the local and global spaces. Rather than greedy gridding to find a union of the global and local space, the method may be performed in an opposite manner to determine a minimum gridding that is the intersection of the global and local space. For example, the difference table used to expand the device pixels for the upper and left edges of the region may be used for the lower and right edges instead thereby reducing the size of the device grid for problematic pixels. The difference table of the preferred embodiment for the bottom and right edges could be used instead on the left and upper edges to similarly minimize the device grid. These and other variations upon and modifications to the preferred embodiment are provided for by the present invention which is limited only by the following claims.

What is claimed is:

1. A computer implemented method for creating a destination region encompassing global space and local space device pixels for an image in source space to eliminate the effects of gridding, the method comprising the steps of:

determining differences in resolution between source space and device space;

determining a period at which a pixel pattern in device space repeats;

determining a relationship between an origin of a global device space and an origin of a local device space;

mapping the image from source space to device space using a local mapping for portions of the image defined in local coordinates and using a global mapping for portions of the image defined in global coordinates;

determining whether the origin of the local device space is positioned at a point with the same period as the origin of the global device space; and selectively increasing a number of device pixels in the local device space and to which portions of the image defined in local coordinates are mapped if the origin of the local device space is not positioned at a point with the same period as the origin of the global device space.

2. The method of claim 1, wherein the step of determining a period at which the pixel pattern in the device space repeats is performed by calculating the value of the source resolution divided by the greatest common divisor of the source resolution and the device resolution.

3. The method of claim 1, wherein the step of determining the relationship between the origin of the global device space and the origin of the local device space comprises the steps of:

calculating the difference between the horizontal position of the origin of the global device space and the origin of the local device space; and calculating the difference between the vertical position of the origin of the global device space and the origin of the local device space.

4. The method of claim 1, wherein the step of determining whether the origin of the local device space is positioned at a point with the same period as the origin of the global device space further comprises the steps of:

determining a horizontal position of the origin of the local device space in global coordinates;

determining the difference between the origin of the global device space and the horizontal position of the origin of the local device space in global coordinates; and determining if the difference is an even multiple of the period.

5. The method of claim 1, wherein the step of selectively increasing the number of device pixels in the local device space further comprises the steps of:

identifying problematic pixels where the device space region needs to be enlarged if the pixels are included;

determining bounds of the source image in device space;

comparing the bounds of the source image to the problematic pixels identified; and enlarging the bounds of the source image to form a device space region of increased size.

6. The method of claim 5, wherein the step of identifying problematic pixels where the device space region needs to be enlarged is performed by creating a difference table between local space mappings and global space mappings.

7. The method of claim 6, wherein the step of selectively increasing the size of the device space region further comprises the steps of:

defining a device space region defined by the bounds of the source image;

comparing a boundary of the device space region to the difference table; and expanding the device space region if the difference table has an offset at the location of the boundary.

8. The method of claim 7, wherein the step of comparing a boundary further comprises the steps of:

comparing points at the left edge of the source region to the difference table; and comparing points on the right edge of the source region to the difference table.

9. The method of claim 7, wherein the step of expanding the device space region further comprises the steps of:

increasing the source region to the left and on the top by the offset in the difference table from comparing the point at the top left; and increasing the source region to the right and on the bottom by the offset in the difference table from comparing the point on the bottom right.

* * * * *